United States Patent [19]

Hamner et al.

[11] 3,920,539

[45] Nov. 18, 1975

[54] HYDROCARBON HYDRODESULFURIZATION UTILIZING A CATALYST OF GERMANIUM GROUP VI-B AND VIII COMPONENTS ON ALUMINA

[75] Inventors: Glen P. Hamner; Willard H. Sawyer, both of Baton Rouge, La.

[73] Assignee: Exxon Research & Engineering Co., Linden, N.J.

[22] Filed: Apr. 19, 1974

[21] Appl. No.: 462,437

[52] U.S. Cl. ............................................ 208/216
[51] Int. Cl.² ........................................ C10G 23/02
[58] Field of Search ............................ 208/216, 217

[56] References Cited
UNITED STATES PATENTS 3,644,198  2/1972  Wilhelm ............................. 208/216
3,773,654  11/1973  Rausch ............................... 208/217
3,791,967  2/1974  Jaffe .................................. 208/216

*Primary Examiner*—Delbert E. Gantz
*Assistant Examiner*—G. J. Crasanakis

[57] ABSTRACT

A desulfurization catalyst which comprises a cogel of catalytically active amounts of a hydrogenation component which includes a Group VIB or VIII metal, or both, and a Group IVA metal, notably germanium, and a porous inorganic oxide support, notably alumina. Such catalysts are particularly effective in the hydrodesulfurization of naphthas, gas oils, whole heavy crudes and residua.

3 Claims, No Drawings

HYDROCARBON HYDRODESULFURIZATION UTILIZING A CATALYST OF GERMANIUM GROUP VI-B AND VIII COMPONENTS ON ALUMINA

Processes for the desulfurization (and denitrogenation) of hydrocarbon feedstocks are well established in the petroleum refining technology. Those wherein the feed is contacted with a catalyst, in the presence of hydrogen, such that at reaction conditions the essential reaction involves the breaking of carbon-sulfur bonds and formation of hydrogen sulfide, with minimum conversion of high boiling materials, e.g., asphaltenes and higher boiling materials, is termed hydrodesulfurization. Some hydrodenitrogenation usually accompanies hydrodesulfurization reactions, but hydrodesulfurization is the predominant reaction. Hydrodesulfurization processes, in any event, are most commonly used commercially for the desulfurization of naphtha and gas oils, although in recent years greater emphasis has been placed on the hydrodesulfurization of heavy petroleum crudes and residua. Even in the hydrodesulfurization of heavy crudes and residua at conditions of deep desulfurization, however, conversion of materials boiling above about 1,050°F. (i.e., 1,050°F.+) is minimal, rarely if ever exceeding about ten or twenty percent conversion of 1,050°F.+ materials. Now, due to supply and demand considerations, greater attention is being given to processes involving the hydroconversion of heavy whole crudes and residua, particularly for the conversion of the 1,050°F.+ portions of these materials.

Typically, hydrodesulfurization and hydroconversion processes employ catalysts constituted of Group VIB or Group VIII iron group metals, or admixtures thereof, composited with a suitable porous refractory inorganic oxide carrier, or support, notably alumina or silica-alumina. The most common Group VIB metal components are molybdenum and tungsten, and the most common iron group metals are cobalt and nickel, a Group VIB metal generally being admixed with a Group VIII metal. Metals other than Group VIB and iron group metals have also been combined with admixtures of Group VIB and iron group metals.

The catalysts are typically prepared by either of two methods. In the most common method, the metal, or metals, is incorporated within a previously calcined support, generally in the form of tablets, pills, pellets, spheres, or extrudates, by impregnation of the support with a solution which contains a soluble salt of the metal, or metals, which is to be added to the support. In the other method, all of the components, inclusive of the carrier material, are coprecipitated from solution. For example, an aqueous solution of aluminum chloride, sodium silicate, cobalt chloride and molybdenum oxide is prepared and the nonaqueous constituents precipitated from solution by the addition of ammonium hydroxide. The metal or metals-containing support in either instance is then dried and calcined to prepare the finished catalyst. The catalyst is most often sulfided, in situ or ex situ, to form the most active species. The metal components of the finished catalyst exists throughout the life of the catalyst in conventional processes as their sulfides, oxides, in their reduced form, or admixtures of these and other forms.

Commonly owned pending application Ser. No. 440,285, filed Feb. 7, 1974, by William F. Arey, Jr., Glen P. Hamner and Willard H. Sawyer, herewith incorporated by reference, discloses large pore catalysts useful for the preparation from heavy dirty crudes and residua of clean liquid products suitable for processing in conventional refining operations. The catalysts, which are particularly suitable for the hydroconversion of the 1,050°F.+ hydrocarbon fractions contained in metals-bearing non-conventionally used heavy crudes and residua, contain Group VIB and Group VIII metals, preferably in admixture, and additionally a Group IVA metal, notably germanium, which acts as a promoter in enhancing the rate of demetallization of a feed. In such application it is specified that the Group IVA metal, or metals, must be incorporated within the catalyst by impregnation.

A primary objective of the present invention is to provide a new catalyst which, although of chemical composition corresponding substantially with that described by reference to Ser. No. 440,285, supra, is prepared in an entirely different way and is characterized by having new and useful properties, particularly when used in the hydrodesulfurization of hydrocarbon feeds.

A particular object is to provide new and improved hydrodesulfurization catalysts, particularly catalysts suitable for hydrodesulfurizing naphtha, distillates, light and heavy gas oils, and heavy crudes and residua.

A further object is to provide hydrodesulfurization catalysts with improved desulfurization and denitrogenation capacity which is a basic need in the processing of such feeds, particularly heavy crudes and residua.

These objects and others are achieved in accordance with the present invention which comprises a cogel of catalytically active amounts of a hydrogenation component which includes a Group VIB or Group VIII metal (especially a Group VIII iron group or nonnoble metal), or both (Periodic Table of the Elements, E. H. Sargent and Co., Copyright 1962 Dyna-Slide Co.), particularly molybdenum or tungsten of Group VIB, and cobalt or nickel of Group VIII, and preferably a Group VIB and Group VIII metal in admixture one metal with the other, or with other metals, or both, and a Group IVA metal, or metals, notably germanium, with a refractory inorganic support, especially a porous inorganic oxide support, particularly alumina, or more particularly gamma alumina.

The cogelled catalysts comprise a composite of a refractory inorganic support material, preferably a porous inorganic oxide support with a metal or compound of a metal, or metals, selected from Group VIB or Group VIII, or both, and a Group IVA metal, or metals, the metals generally existing as oxides, sulfides, reduced forms of the metal or as mixtures of these and other forms. Suitably, the composition of the catalysts comprises from about 5 to about 50 percent, preferably from about 15 to about 25 percent (as the oxide) of the Group VIB metal, from about 1 to about 12 percent, preferably from about 4 to about 8 percent (as the oxide) of the Group VIII metal, and from about 0.01 to about 10 percent, preferably from about 2 to about 5 percent of the Group IVA metal, based on the total weight (dry basis) of the composition. The preferred active metallic components, and forms thereof, comprise an oxide or sulfide of molybdenum and tungsten of Group VIB, an oxide or sulfide of nickel or cobalt of Group VIII, preferably a mixture of one of said Group VIB and one of said Group VIII metals, admixed with an oxide or sulfide of a Group IVA metal comprising germanium, tin, or lead, or admixture of such metals with each other or with other metals. The Group IVA metals enhance the effectiveness of the catalyst in desulfurizing a feed, for which purpose germanium is particularly preferred.

The cogelled catalyst of this invention includes a combination of properties comprising surface areas ranging at least about 100 $M^2/g$ to about 600 $M^2/g$, preferably at least about 250 $M^2/g$ to about 450 $M^2/g$, pore volumes ranging from about 0.1 to about 3.0 cc/g, preferably from about 0.35 cc/g to about 1.5 cc/g (B.E.T.), and average pore diameters ranging generally from about 30A (Angstrom Units) to about 500A, preferably from about 60A to about 300A, dependent upon the type of hydrocarbon feed to be processed. Preferably, light hydrocarbon feeds, or feeds boiling between about 100°F. and about 900°F., are treated with catalysts of average pore diameter ranging from about 30A to about 100A, preferably from about 50 to about 80A, and hydrocarbon heavy crude petroleum and residua feeds are treated with catalysts of average pore diameter ranging from about 100A to about 500A, preferably from about 100A to about 200A as measured by the single point nitrogen adsorption (B.E.T.) method. Alternate methods used include measurement of the nitrogen adsorption isotherm, wherein the nitrogen is adsorbed at various pressures. [Technique described in Ballou et al., Analytical Chemistry, Vol. 32, April 1960, using Aminco Adsorptomat (Catalogue No. 4-4680) and Multiple Sample Accessory (Catalogue No. 4-4685), Instruction No. 861-A, which uses the principle of adsorption and desorption of gas by a catalyst specimen at the boiling point of nitrogen.]

The novel cogelled catalysts, pursuant to a preferred method of preparation, are prepared from an aqueous or alcohol synthesis sol comprising dispersing salts of aluminum and a Group IVA metal, preferably germanium, in an aqueous or alcohol medium, and adding an organic reagent which combines with the halide and removes the halide from solution as an organic halide, with control of water (or alcohol):alumina salt ratios, and control and removal of hydrogen halide acid generated with reaction, preferably with the additional incorporation of Group VIII noble metals or lanthanum or lanthanum series metal salts, or both, to provide selective pore size distributions with concurrent optimization of surface area and pore volume.

In such preparations, an aluminum halide, e.g., aluminum chloride, is first dispersed or slurried in water or alcohol in certain critical proportions, defined for convenience in terms of the molar ratio of water (or alcohol):aluminum halide, dependent of whether it is desired to produce large pore or small pore catalysts. The temperature of the aluminum halide-water (or alcohol) slurry, to which thte desired Group IVA metal, or metals, is added, preferably along with a Group VIB or Group VIII metal, or both, and other metals, is then lowered. Normally, water is used as the solvent for forming large pore size catalysts, and alcohols, such as methanol, can be used in the formation of catalysts which have small pore sizes. It is essential in the reaction to add a reagent which will remove the halide from solution while maintaining pH in the range of 5-8, this being preferably accomplished by addition of an olefin oxide, e.g., ethylene oxide, propylene oxide, and the like, which forms a halohydrin. The reaction is necessarily carried out at relatively low temperature, preferably from about 0°F. to about 100°F., and more preferably from about 32°F. to about 60°F. The olefin oxide is added in at least stoichiometric quantities in relation to the amount of halide to be removed from the solution, and preferably is added in molar excess to the solution.

After completion of the reaction, the temperature of the gel is raised to from about ambient to about 180°F. to form a sol. Preferably, the sol is formed at essentially ambient temperature, ranging generally from about 70°F. to about 80°F. and, on proper aging, pseudoboehmite is produced. It is essential to age the gel at such temperature for at least about 6 hours, and preferably for about 24 hours to about 72 hours while the gel is in contact with its syneresis liquid. Lesser periods of aging results in reducing the uniformity of pore sizes, and significantly longer periods, particularly periods in excess of 6 days, often produces bimodal distribution of the pores. Failure to properly age the gel, while it is in contact with the syneresis liquid, also produces a crystal structure which is not sufficiently stable to retain the desired particle size distributions in the subsequent and necessary steps of washing, drying and calcination.

The Group VIII noble metals and lanthanum and lanthanum series metals, or compounds thereof, as reported in Application Ser. No. 440,316, filed Feb. 7, 1974, by William J. Mattox, are admirably suitable as promoters for providing narrow pore size distributions and, in conjunction with control of the concentration of the reactants employed in the synthesis, the temperature, and particularly the acidity of the synthesis solution, these promoters can be used to provide catalysts of optimum pore size distributions. Catalysts which meet even the preferred specifications of the catalysts can thus be made by incorporation of small amounts of Group IIIB metals of Atomic Number 57 and greater, and Group VIII noble metals, or both, or compounds or salts thereof, within the solution during the synthesis. Exemplary of the former are such metals as lanthanum, and the rare earth metals of the lanthanum series such as cerium, praseodymium, neodymium, promethium, samarium, europium, gadolinium, terbium, dysprosium, holmium, erbium, thulium, ytterbium and lutetium. Examplary of the Group VIII noble metals are ruthenium, rhodium, palladium, osmium, iridium, and platinum, which metals are less preferred than the lanthanum series metals because of their greater cost. Suitably, such metals, or compounds thereof, are added to the solution used for preparation of the catalysts, in molar ratios of promotor metals:aluminum halide ranging from about 0.001:1 to about 0.06:1, and preferably from about 0.01:1 to about 0.03:1. The reason for the effectiveness of these metals, particularly the lanthanum metals, generally added as soluble salts, e.g., as halides, acetates, nitrates, sulfates, etc., in producing the high uniformity of pore sizes in the desired ranges, when employed at the conditions defined, is not understood.

The syneresis liquid, after the aging step, is poured off of the Group IVA metal cogel, or cogel which contains, besides the Group IVA metal a Group VIB or Group VIII metal, or both. It is particularly preferred to partially air dry and then wash the cogel with alcohol, to remove contaminants, after which the catalyst is air dried at room temperature, and then dried at mild temperatures, e.g., at about 175°–225°F. for about 3 to 6 hours, then calcined, e.g., by heating at about 800°–1,100°F. for about 1 to 24 hours. If desired, the cogel, after its formation, can be impregnated with a predetermined amount of an additional metal, or metals. The washing step is critical in the formation of the desired pore size distribution. Generally, isopropanol or one of the intermediate alcohols, e.g., n-propyl, isobutyl, and the like, promotes the formation of the desired pore sizes. Methanol, on the other hand, forms smaller pores generally, and hexyl alcohol forms larger pores. Mixtures of water and intermediate alcohols also favor the formation of intermediate sized pores.

Impregnation of the alumina with additional metals, if desired, can be done prior or subsequent to the calcination step. If subsequent to the calcination step, it is best to allow the calcined alumina to equilibrate with the moisture in the air for 4–6 hours prior to impregnation to avoid damage to the pore structure. It is imperative that the impregnation be done with a non-aqueous solution, e.g., alcohol, rather than water solution. If water solutions are used, the pore structure will readily shrink during subsequent drying and calcination. The catalytic metals, e.g., cobalt and molybdenum, are dissolved in alcohol, e.g., methanol, and preferably isopropanol, and the solution imbibed into the alumina. Drying for 16–24 hours in air at ambient conditions, then drying for about 3–6 hours at 175°–225°F., and then calcining at 800°–1,100°F. for 1–4 hours, will preserve the desired pore structure. The catalyst is then crushed and screened to the desired particle size for testing, usually 14–35 mesh (Tyler).

The catalyst is generally employed in one or more stages of a reactor, or reactors aligned in series. The catalyst, when used for hydrodesulfurization of naphthas, distillates and light and heavy gas oils, after being reduced and sulfided generally in situ within the reactor, is operated under conditions, the major variables of which are tabulated for convenience as follows:

|  | Operable | Preferred |
|---|---|---|
| Temperature, °F., E.I.T.[1] | | |
| Start-of-Run | 400 | 550 |
| End-of-Run | 850 | 775 |
| Pressure, psi | 200–10,000 | 400–5000 |
| Hydrogen Rate, SCF/B | 200–20,000 | 500–10,000 |
| Space Velocity, LHSV | 0.25–10 | 0.25–5.0 |

When used for the hydrodesulfurization of heavy crudes and residua the catalyst, after having been sulfided, is operated under conditions, the major variables of which are tabulated for convenience, as follows:

|  | Operable | Preferred |
|---|---|---|
| Temperature, °F., E.I.T.[1] | | |
| Start-of-Run | 700 | 750 |
| End-of-Run | 850 | 800 |
| Pressure, psi | 2000–10,000 | 2000–5000 |
| Hydrogen Rate, SCF/B | 3000–20,000 | 3000–10,000 |
| Space Velocity, LHSV | 0.25–5.0 | 0.5–1.0 |

[1]Equivalent Isothermal Temperature (E.I.T.)

The invention will be more fully understood by reference to the following selected nonlimiting examples and comparative data which illustrate its more salient features. All parts are given in terms of weight units except as otherwise specified.

EXAMPLES

To demonstrate the effectiveness of the catalysts of this invention, a series of three catalysts was prepared under similar conditions, viz., (1) Catalyst A: a cogel of cobalt-molybdenum composited with alumina, no other metal being present, (2) Catalyst B: a cogel catalyst prepared under conditions identical to those under which the preceding catalyst A was prepared, and of the same composition except that germanium was additionally added with the cobalt and molybdenum, and (3) Catalyst C: an impregnated catalyst of chemical composition identical to Catalyst B. The methods of preparation were as follows:

Catalyst A

In the preparation of this Catalyst A, 1160 grams of $AlCl_3.6H_2O$ was weighed, transferred to a large glass beaker, and this material slurried in a 500 cc. portion of deionized water. The portion of slurried material was then cooled to 35°F., and gaseous ethylene oxide was then introduced at a rate of 12.5 grams per minute until sufficient ethylene oxide has been added to provide molar ratios of $C_2H_4O/HCl$ ranging from 0.55 to 0.8, this being about one-half of the amount of ethylene oxide required to complete formation of a gel.

Solutions were added which contained (a) 64.2 grams of $CoCl_2.6H_2O$ dissolved in 200 cc $H_2O$ and (b) 95 grams of phosphomolybdic acid dissolved in 200 cc $H_2O$. The balance of the ethylene oxide was then added, providing molar ratios of $C_2H_4O/HCl$ in total amount ranging from about 1.1 to 1.6.

The resulting clear solution was then allowed to slowly warm to an ambient temperature of 75°F., a rigid cogel having begun to form after about 1 hour. The cogel was permitted to age at this temperature for a period ranging 24 to 72 hours while in contact with its own syneresis liquid, the syneresis liquid having become visible as a stratified layer above the block of solidified cogel and between the glass walls and side boundaries of the solidified cogel which began to shrink away from the glass and exude the syneresis liquid.

The cogel, after the aging period, was then separated from its syneresis liquid by merely pouring off the liquid. The cogel, having the appearance of a dry block of material, was then crushed into a particulate mass, and then thoroughly washed with 5 gallons of isopropyl alcohol containing 1,000 cc $NH_4OH$ in a column or by successive decantation. The washing was continued until the effluent from the column was free of chloride, as determined by testing for chloride with silver nitrate test solution. The particulate mass was then thoroughly dried in air for 15–25 hours and at 190°F. for a period ranging between 6 and 24 hours, and thereafter calcined at 1,000°F. for a period of from 2 to 4 hours.

The final catalyst contained 6 wt.% CoO and 20.5 wt.% $MoO_3$.

Catalyst B

In the preparation of Catalyst B, a procedure identical to that described with reference to the preparation of Catalyst A was followed except that in this particular preparation a solution of $GeCl_4$ dissolved in 585 cc of $H_2O$ equivalent to 10.4 g GeO was also added with the $CoCl_2.6H_2O$ and phosphomolybdic acid solutions after one-half of the required ethylene oxide had been added to the preparation mixture.

The final catalyst contained 5.9 wt.% CoO, 20.2 wt.% $MoO_3$ and 3.0 wt.% GeO.

Catalyst C

In the preparation of Catalyst C, the procedure employed in the preparation of Catalyst A was again repeated.

A one-hundred gram portion of the particulate, dry, calcined cobalt-molybdenum cogel was further impregnated with a solution containing 16.9 cc of $GeCl_4$ in an aqueous solution equivalent to 0.3 g of germanium (3.0 wt.% GeO final catalyst). The catalyst was subsequently dried at room temperature and at 190°F. and then calcined for 2 hours at 1,000°F.

The chemical composition of the catalyst is identical to that described as Catalyst B.

The three catalysts were each employed in three separate hydroprocessing runs, at identical process conditions, to treat a desalted Jobo crude, identified in Table 1, below:

TABLE I

| | |
|---|---|
| Gravity, °API | 8.5 |
| Sulfur, Wt.% | 3.8 |
| Carbon, Wt.% | 83.92 |
| Hydrogen, Wt.% | 10.49 |
| Con Carbon, Wt.% | 13.8 |
| Asphaltenes, Wt.% | 17.7 |
| Nitrogen, Wt.% | 0.68 |
| Metals, ppm | |
| Ni | 97 |
| V | 459 |
| Distillation, 1 mm | |
| IBP, °F. | 518 |
| 5% (Vol.%) | 627 |
| 10 | 682 |
| 20 | 798 |
| 30 | 895 |
| 40 | 978 |
| 50 | 1037 |
| % Recovered | 50.8 |
| % Residue | 48.2 |
| FBP, °F. | 1047 |

The results of the runs are as given in Table 2, which follows:

TABLE 2

| Catalyst | A | B | C |
|---|---|---|---|
| Process Conditions | | | |
| Temperature, °F. | | 758 | |
| V/V/Hr | | 0.96 | |
| Pressure, psig | | 2250 | |
| Gas Rate, SCF H₂/Bbl. | | 6000 | |
| Liquid Product Inspections | | | |
| Gravity, °API | 16.8 | 18.7 | 16.3 |
| Sulfur, Wt.% | 1.143 | 0.704 | 1.344 |
| Nickel, ppm | 22 | 24 | 20 |
| Vanadium, ppm | 57 | 113 | 38 |
| Nitrogen, Wt.% | 0.55 | 0.42 | 0.55 |
| % Removals | | | |
| Sulfur | 71 | 82.5 | 66 |
| Nickel | 75 | 74 | 78 |
| Vanadium | 89 | 79 | 93 |
| Nitrogen | 20 | 39 | 20 |
| Rate Constants | | | |
| Sulfur | 0.591 | 1.022 | 0.486 |
| Nickel | 0.715 | 0.68 | 0.799 |
| Vanadium | 1.444 | 0.843 | 1.837 |

These data thus show that Catalyst B is far more effective for removal of sulfur than either of Catalysts A or C. It is thus a considerably more effective hydrodesulfurization catalyst than Catalyst A, from which it differs only in that it contains germanium as an additional component, and even more effective than Catalyst C which is of the same chemical composition, Catalysts B and C differing only in the manner in which they were prepared. Catalyst B is also far superior to either Catalysts A or C as a hydrodenitrogenation catalyst. In fact, Catalyst B is shown to be essentially twice as effective for nitrogen removal as either Catalyst A or C.

Catalyst C is also shown to be more effective for total metals removal, and is particularly effective for the removal of vanadium from the feed.

As will be apparent to those skilled in this art, various modifications and changes can be made without departing the spirit and scope of the present invention.

Having described the invention, what is claimed is:

1. A process for the hydrodesulfurization of a hydrocarbon feedstock comprising contacting said feedstock, at hydrodesulfurization conditions with a catalyst composite said composite having been prepared by drying and calcining a cogel of alumina with a hydrogenation component, said hydrogenation component comprising from about 5 to about 50 weight % of molybdenum or tungsten, or compounds thereof, from about 1 to about 12 weight % of nickel or cobalt, or compounds thereof, and from about 0.01 to about 10 weight % of germanium, or compounds thereof, measured as oxides.

2. The process of claim 1 wherein said hydrogenation component comprises from about 2 to about 5 percent of said Group IVA metal, or compound thereof, from about 15 to about 25 percent of said Group VIB metal, or compound thereof, and from about 4 to about 8 percent of said Group VIII non-noble metal, or compound thereof, measured as oxides.

3. The process of claim 1 wherein the surface area of the catalyst composite ranges from about 100 M²/g to about 600 M²/g, pore volume ranges from about 0.1 to about 3.0 cc/g and average pore diameters range from about 30A to about 500A.

* * * * *